Dec. 28, 1954 B. R. ROBERTS ET AL 2,698,026
SAFETY SHUTOFF REGULATOR
Filed May 6, 1954 4 Sheets-Sheet 1
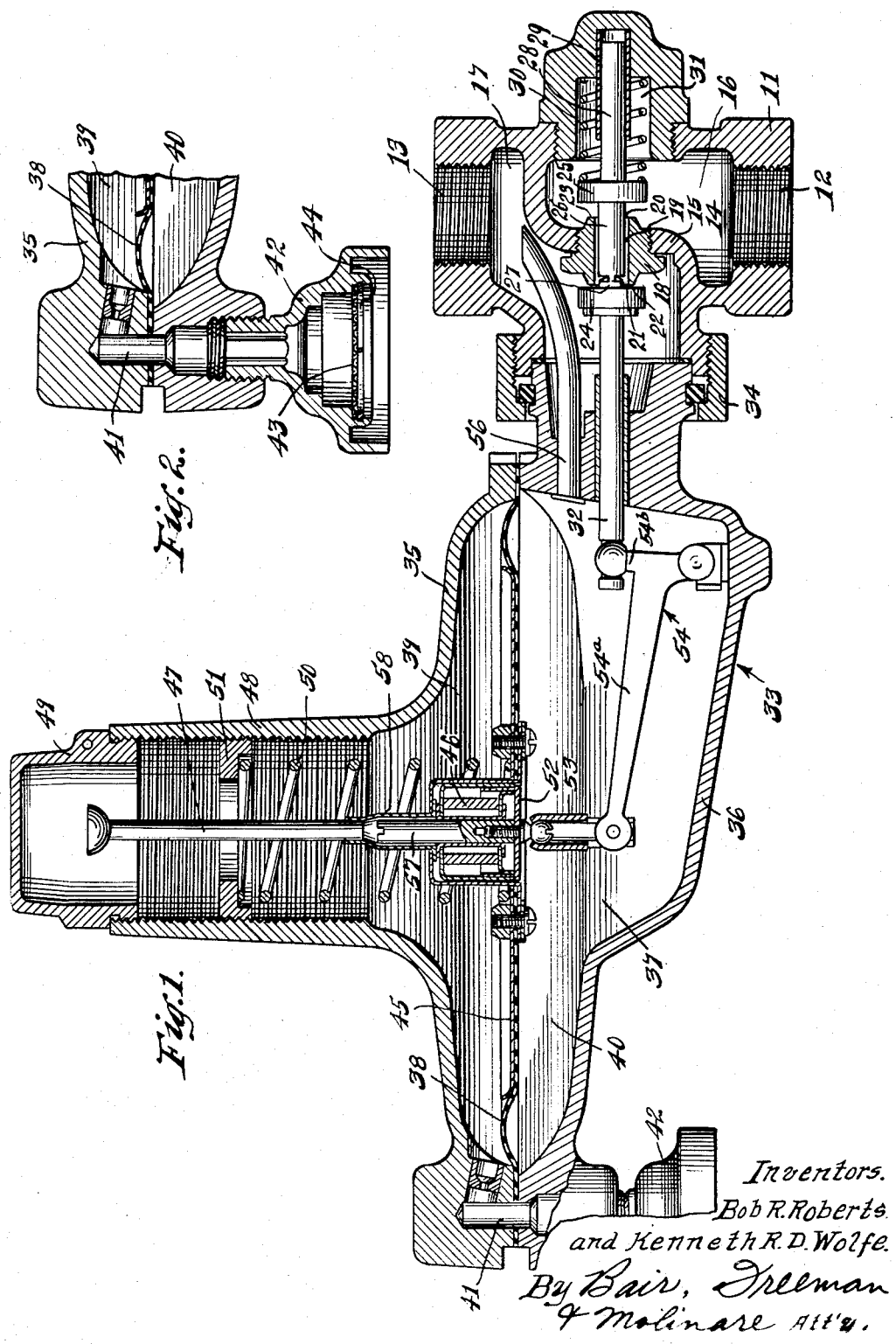
Inventors.
Bob R. Roberts
and Kenneth R. D. Wolfe.
By Bair, Freeman
& Molinare Att'y.

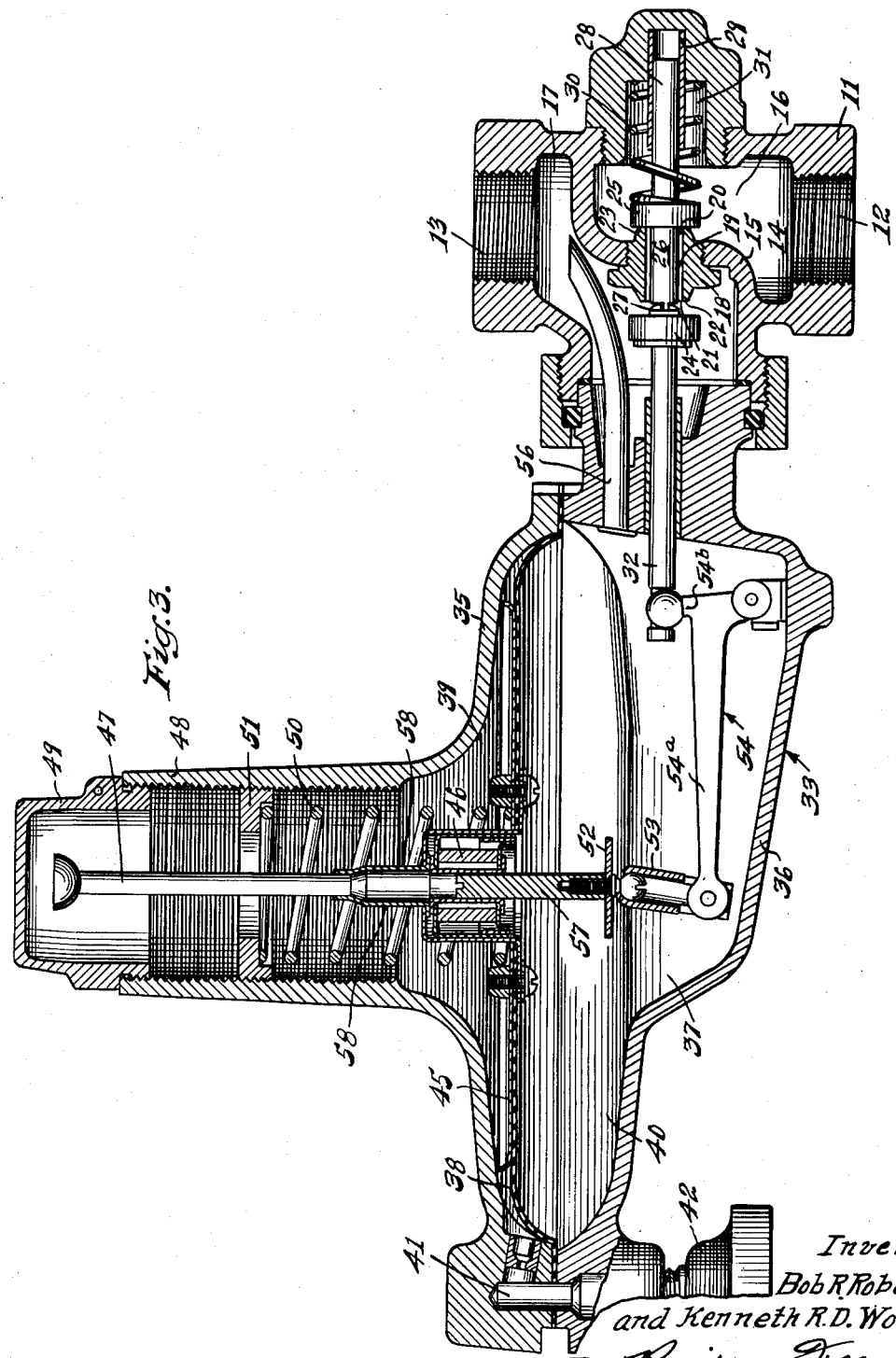

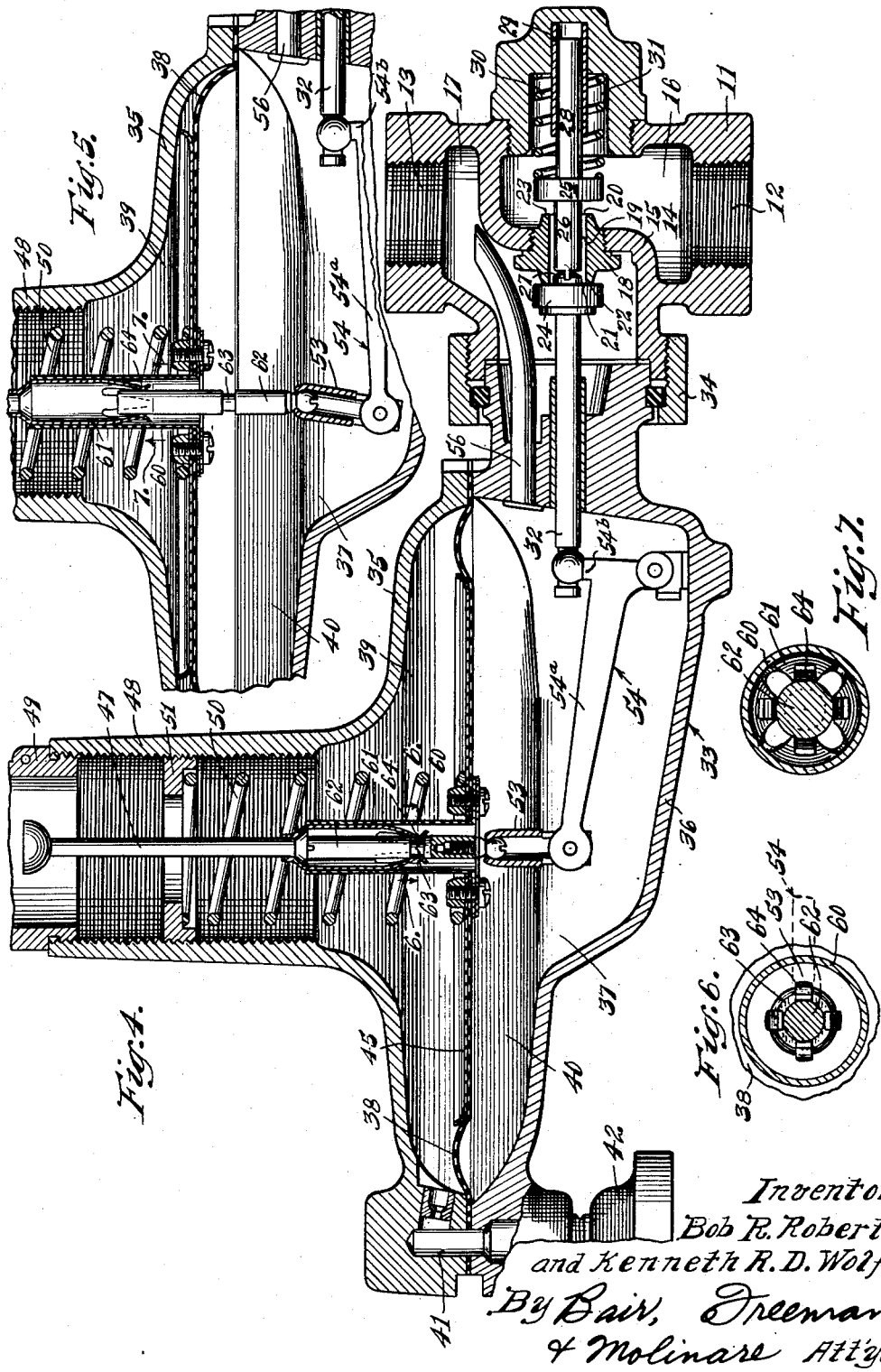

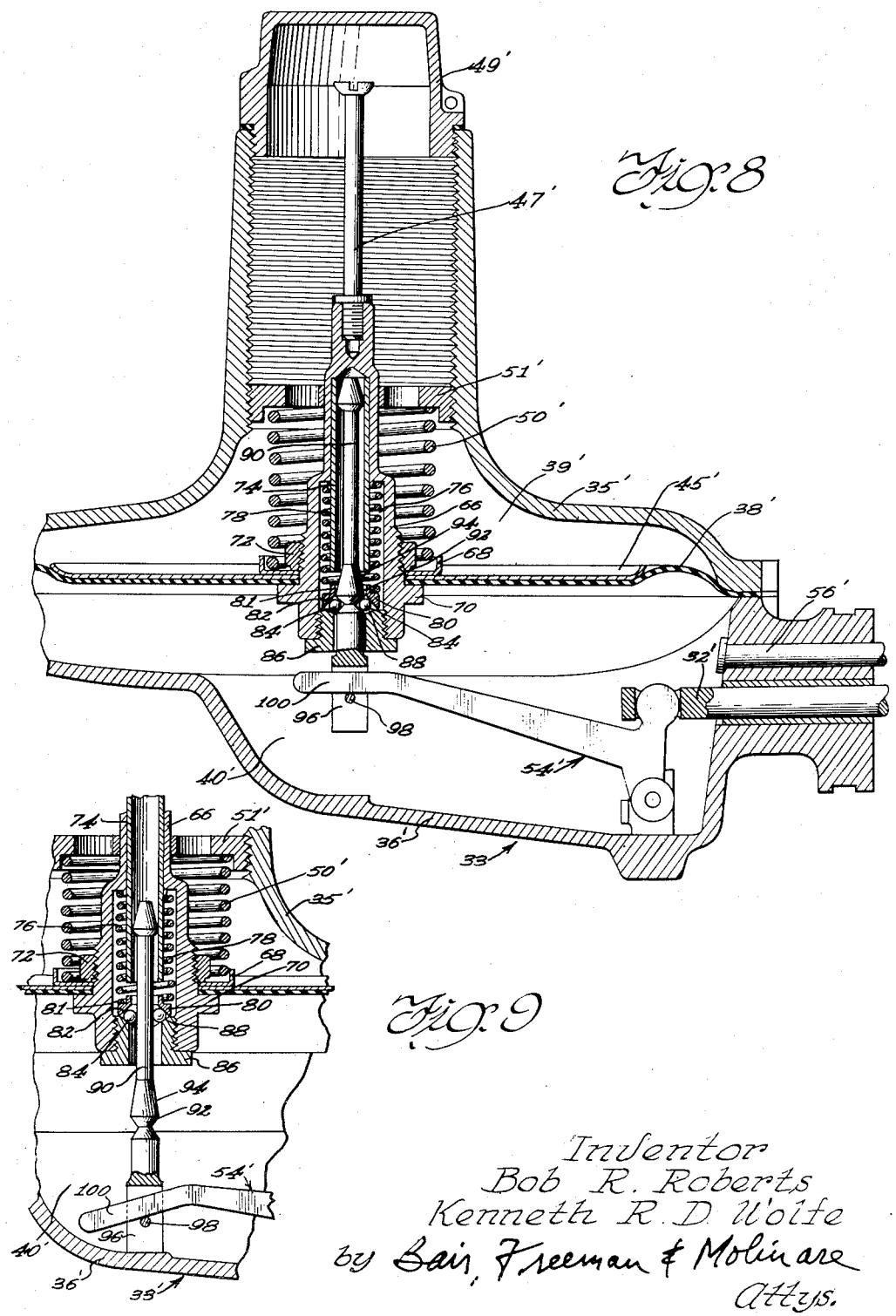

United States Patent Office 2,698,026
Patented Dec. 28, 1954

2,698,026

SAFETY SHUTOFF REGULATOR

Bob R. Roberts and Kenneth R. D. Wolfe, Marshalltown, Iowa, assignors to The Fisher Governor Company, Marshalltown, Iowa, a corporation of Iowa Application May 6, 1954, Serial No. 427,908

17 Claims. (Cl. 137—458)

This invention relates to pressure regulators for fluid flow systems and more particularly to safety shut-off regulators.

This application is a continuation-in-part of our pending application on a Safety Shut-Off Regulator, Serial No. 149,142, filed March 11, 1950, now abandoned.

The use of pressure regulators in fluid flow systems is widespread. For example, pressure regulators are used extensively by public service companies which deliver natural gas to the consumer. Normally, such a regulator is commonly referred to as a house service regulator, on natural, manufactured or other types of gas lines, to reduce the distribution main pressure as the gas service enters the house, from x pounds normal pressure, down to a fraction of one pound per square inch, usually four to eight ounces reduced pressure, more or less.

These pressure regulators, in general, are usually set for an average delivery pressure, and have a narrow pressure responsive range. Thus, such pressure regulators are designed to shut off the flow of gas when the gas delivery pressure either exceeds a certain amount or is lower than a certain other amount.

Different types of shut-off features have been devised in the past for use with pressure regulators and this invention is utilized in connection with pressure regulators having one of such shut-off features. The safety pressure regulators to which the present invention relates operate as follows: When the delivery pressure is too high, a valve cuts down the flow or shuts off the flow completely. When the delivery pressure is too low, another valve shuts off the gas flow. The high pressure state is most dangerous to the consumer and, therefore, a further device is incorporated in said safety pressure regulators which provides that, in case the first valve fails to shut off the flow when the gas is being delivered under excessively high pressure, then a safety vent opens, which permits the gas to be by-passed to the outside of the home of the consumer.

However, this by-pass arrangement has many undesirable features. When these regulators were set for one pound relief pressure, it has been found under certain conditions, where residential buildings have been constructed close together, as they are in some cities, that such a setting permits a hazardous condition to occur. If the regulator fails, and the pressure builds up to the one pound valve, it tends to blow through the relief valve, and exhaust to the atmosphere through the outside vent. If the buildings are close together there is a possibility of venting gas from the failed regulator into an open window of a nearby residence, thereby causing a hazardous condition in the second building.

Thus, one of the objects of this invention is to provide a pressure regulator for a fluid flow system which has a first valve which will normally block the flow of liquid when the pressure exceeds a certain limit and which upon failure of the first valve to act will "fail safe" so that a second valve will block the flow of fluid.

Another object of this invention is to provide a pressure regulator which will block the flow of fluid when the pressure exceeds a certain limit, will block the flow of fluid when the pressure falls below a certain limit, or if the inlet pressure is lost and will provide a safety shut-off if the high pressure valve fails to close.

Still another object of this invention is to provide a novel safety shut-off, for use with a fluid flow pressure regulator, which safety shut-off will close under all adverse operating conditions, such as when the outlet pressure of the fluid is too high or too low, or when the inlet pressure is too low, or when a break occurs in the delivery line either upstream or downstream of the pressure regulator; which safety shut-off closing operation will be referred to hereinafter as "failing safe."

Still another object of this invention is to provide a novel safety shut-off for use with a pressure regulator which will "fail safe" when the primary means for closing the valve fails to operate successfully.

A further object of this invention is to provide a pressure regulator which may be easily reset after "failing safe."

A still further object of this invention is to provide a safety shut-off for a pressure regulator which will close the valve in case the diaphragm fails or develops a rip or hole therein.

Further objects and advantages of this invention will become apparent as the following description proceeds and the features of novelty which characterize this invention will be pointed out with particularity in the claims annexed to and forming part of this specification.

Two preferred embodiments of this invention are shown in the accompanying drawings, in which:

Figure 1 is a vertical cross-sectional view of the valve and regulator, when the valve is operating;

Figure 2 is a detail view of the weatherproof vent;

Figure 3 is a vertical cross-sectional view similar to Figure 1, showing the regulator after it has "failed safe";

Figure 4 is similar to Figure 1 and shows a modification of the disconnecting members which provide for the "failing safe" of the valve;

Figure 5 is similar to Figure 3 and shows the modification of Figure 4 after the regulator has "failed safe";

Figure 6 is a detail view of the spring clasp modification taken on line 6—6 of Figure 4;

Figure 7 is another detail view of the spring clasp modification taken on line 7—7 of Figure 5;

Figure 8 is a fragmentary view similar to portions of Figures 1 and 4 showing another modification of the disconnecting member which provides for the "failing safe" of the valve; and Figure 9 is a fragmentary view similar to Figures 5 and 3 and shows the modification of Figure 8 after the regulator has "failed safe."

Referring to Figures 1 and 2, there is shown a valve body 11 having an inlet 12 and an outlet 13. A fluid flow passageway 14 is bounded by the valve body 11. An internal body member 15 divides the fluid flow passageway 14 into an inlet portion 16 and an outlet portion 17. An orifice member 18 is mounted on internal body member 15 in the fluid flow passageway 14. The orifice member 18 has a bore 19 therethrough which connects the two portions 16 and 17 of the fluid flow passageway 14.

The inlet end of orifice member 18 is designated at 20 and the outlet end is designated at 21. The face of the orifice member 18 at the outlet end 21 constitutes a first valve seat 22 and the face of the orifice member 18 at the inlet end 20 constitutes a second valve seat 23.

A first valve disc 24 is mounted in the outlet portion 17 of fluid flow passageway 14 and is adapted to seat on valve seat 22 in order to stop flow of fluid. A second valve disc 25 is mounted in the inlet portion 16 of fluid flow passageway 14 and is adapted to seat on valve seat 23 in order to stop the flow of fluid. The valve discs 24 and 25 are joined together by a connecting stem 26. Connecting stem 26 passes through bore 19 of orifice member 18 thus leaving an annular passageway through orifice member 18. The valve discs 24 and 25 are spaced apart so that only one valve disc at a time is seated and also so that there are intermediate positions in which the ends 20 and 21 of orifice member 18 are unblocked and fluid flows.

A joint 27 is provided in connecting stem 26 to provide flexibility in the valving system. Thus, if any of the seating surfaces on the orifice member 18 or on the valve discs 24 and 25 are out of alignment, the joint 27 provides sufficient flexibility to insure flush contact between the valve disc and the valve seat.

A guide stem 28 is attached to the back face of valve disc 25 and is positioned in a sleeve 29 mounted in valve body 11. A spring 30, mounted concentrically with guide stem 28, is positioned in recess 31 in valve body 11. The spring 30 bears against the back face of valve disc 25 to normally bias valve disc 25 toward valve seat 23.

An actuating stem 32 is attached to the back face of valve disc 24 and extends outwardly from the valve body 11 into a pressure regulator generally indicated at 33. The pressure regulator 33 has an upper body portion 35 and a lower body portion 36. These body portions 35 and 36 are castings which, when joined together, completely bound an internal chamber 37. The lower body portion 36 of the pressure regulator is secured to the valve body 11 by means of a connector 34.

A pressure sensitive diaphragm 38, formed preferably of rubber or some suitable flexible synthetic rubber-like material, is mounted in chamber 37 and is clamped between body portions 35 and 36. This diaphragm 38 divides chamber 37 into an upper chamber 39 and a lower chamber 40. Diaphragm 38 prevents any fluid flow between upper chamber 39 and lower chamber 40.

A weatherproof vent 41 communicates with the upper chamber 39 and ports through a spout 42. Mounted in the mouth of the spout is a screen 43, held in position by a snap ring 44.

Mounted on the upper side of diaphragm 38 is a reinforcing plate 45. A permanent magnet 46 of annular form is also secured to the diaphragm 38. A reset rod or stem 47 is mounted above the magnet 46 concentrically with the annular magnet and extends upwardly through a bonnet-like extension 48 of upper body portion 35. The bonnet-like extension 48 is closed by a removable cap 49 which provides easy access to the reset rod 47. Spring 50 is positioned in the upper chamber 39 concentrically with the reset rod 47 and magnet 46. The spring 50 is positioned between the upper side of reinforcing plate 45 and a shoulder 51 which is positioned in the bonnet-like extension 48. The shoulder 51 is threaded so that it may be screwed into position in bonnet-like extension 48. This threading provides for spacing adjustment of the shoulder relative to reinforcing plate 48. This adjustment varies the force exerted by spring 50 on reinforcing plate 45.

A plate 52, made of a ferrous or other magnetic material, is normally held in the position shown in Figure 1 by the magnet 46. The connection between magnet 46 and plate 52 is separable, or rupturable. The plate 52 is positioned relative to the diaphragm 38 so as to lie in the lower chamber 40. A link 53 is pivotally attached at one end to plate 52 and extends downwardly in lower chamber 40. The other end of link 53 is pivotally attached to arm 54a of a bell crank 54.

A guide rod 57 extends upwardly from plate 52 through the center hole of annular magnet 46 and into a tubular member 58. The tubular member 58 is mounted above the magnet and has the reset rod 47 secured to the upper end thereof.

The bell crank 54 lies completely in lower chamber 40 and is pivotally mounted on lower body portion 36. The actuating stem 32 of the valve discs 24 and 25 passes through a sleeve 55 in the lower body portion 36 of the regulator 33 and extends into lower chamber 40. There the extended end of stem 32 is attached to arm 54b of bell crank 54.

A tube 56 passes through lower body portion 36 and provides a fluid passageway between outlet portion 17 of fluid flow passageway 14 and the lower chamber 40.

An alternate form of the mechanically separable, or rupturable, connection between the diaphragm 38 and the linkage to the bell crank 54 is shown in Figures 4 and 5, wherein similar numbers are given to parts of Figures 1 to 3. Here no magnet is utilized, but a sleeve 60 is mounted on the diaphragm 38. An inner tubular member 61 is mounted within sleeve 60 and has secured, to the upper end thereof, the reset rod 47. All the parts are in sealed relation so as to shut-off any fluid communication between upper chamber 39 and lower chamber 40. Attached to the link 53 is a guide rod 62 which extends upward into sleeve 60 and into inner tubular member 61. A circular groove 63 extends all the way around guide rod 62 as shown. The lower end of inner tubular member 61 is cut and bent so as to form four spring prongs 64 which enter groove 63 and clasp guide rod 62 so as to hold guide rod 62 in position.

*Operation*

In the operation of the safety shut-off regulator shown in Figures 1 to 3, the fluid passes through the fluid flow passageway 14 in valve body 11. The pressure of the fluid in the outlet portion 17 of fluid flow passageway 14 is communicated to the lower chamber 40 of the pressure regulator 33 by means of tube 56. The force of the springs 50 and 30 are transmitted through a series of members which are connected to each other so as to correctly position the pressure sensitive diaphragm 38 when the desired delivery pressure obtains in lower chamber 40. In that case, both valve discs 24 and 25 are unseated and the fluid passageway 19 provides passage for the fluid between the inlet 12 and the outlet 13 of valve body 11.

During normal operation, if there is a demand for gas on the downstream side of the regulator, it will tend to lower the gas pressure under the diaphragm, and the spring 50 will force the diaphragm downward. Through the action of bell crank 54, the valve disc 24 is backed away from its valve seat 22, thus allowing more gas to flow and satisfying the demand for gas.

When operating, the ferrous plate 52 is held in position by magnet 46, as is shown in Figure 1. As the gas pressure increases, the increased pressure in the lower chamber 40 counterbalances a portion of the spring pressure exerted by spring 50, and the diaphragm 36 is pushed upward. This motion is transmitted through bell crank 54 so as to actuate valve disc 24 toward its seat 22.

If for some reason the valve disc 24 is prevented from fully seating on valve seat 22, and the pressure continues to increase, such a pressure increase will be communicated to the lower chamber 40 of the regulator. The diaphragm 38 will tend to move up further but the valve 24 can move no further towards its seat 22 because it is blocked. Then the plate 52 is prevented from accompanying the diaphragm 38 in its upward movement. This breaks the magnetic contact between plate 52 and magnet 46 and the magnetic force between these two members will be destroyed.

Then the only force upon the valve seats will be the force of spring 30. Spring 30 acts to seat valve disc 25 on valve seat 23 and the bell crank 54 is correspondingly rotated and the plate 52 drops even further away from the magnet 46. It can be seen that the failure of valve disc 24 to seat correctly results in the separation of parts of regulator so that another valve disc 25 is seated upon its valve seat. In order to reset the regulator, the cap 49 should be removed, and the reset rod, or stem, 47 is manually depressed. When the magnet 46 reaches the ferrous plate 52 it will seize plate 52 by magnetic force and then the assembly will remain in position. It is then necessary to lift upwards on the resetting stem 47 to unseat valve disc 25 and restore the entire regulator and valves to an operating position. The guide rod 57 serves to keep the separable members aligned.

When the gas pressure falls below the normal operating pressure, the pressure in lower chamber 40 is correspondingly reduced and the spring 50 acts to force the diaphragm 38 downward and this motion results in the moving of valve disc 25 toward its seat 23.

It can be seen that there is no separation of the magnetic portions of the regulator in the low pressure condition. In that case, the diaphragm 38 goes downward but even after valve disc 25 seats, there is no tendency of the plate 52 to separate from the magnet 46 as they are both being forced against each other when in the low pressure condition. However, the low pressure condition is not as dangerous as the high pressure condition and, therefore, the operation of the safety features of the regulator is designed to take place when the most dangerous condition occurs.

When a break occurs in the line either upstream or downstream of the pressure regulator, a low pressure condition will usually occur in the regulator and valve disc 25 will be seated.

It will be noted that if the diaphragm 38 fails or develops a rip or hole therein, the pressure will equalize on both sides of the diaphragm 38 and the spring 50 will push the diaphragm 38 downward. This motion of diaphragm 38 is transmitted through bell crank 54 so as to seat valve disc 25 on its seat 23, thus closing the fluid flow passageway 14.

The modification shown in Figures 4 and 5 provides for the same separation of diaphragm 38 from operating connection with bell crank 54, and is for the same purpose. In this modification, spring prongs 64 clasp a guide rod 62 by means of circular groove 63 and communicate the motion of the diaphragm 38 to the bell crank 54. Once again, if the valve disc 24 fails to seat correctly and the pressure in the lower chamber 40 increases, the diaphragm 38 will continue to rise and the spring prongs 64 will be forced to leave the circular groove 63. Then the force of spring 30 will force valve disc 25 on to its valve seat 23 and the bell crank 54 will move correspondingly so that the guide rod 62 will drop to a position as shown in Figure 5. Then to reseat the regulator, the cap 49 must be removed and the reset rod 47 must be depressed until the spring prongs 64 clasp the guide rod 62 at the circular groove 63. It is then necessary to lift upon the resetting stem 47 to unseat valve disc 25 and to restore the entire regulator and valves to an operating position. Guide rod 62 serves to keep the separable members aligned for ease in resetting.

*Figures 8 and 9*

Another alternate form of a mechanically separable, or rupturable, connection between the diaphragm and the bell crank is shown in Figures 8 and 9, wherein parts which have similar functions to parts shown in Figures 4 and 5 are given the same number primed. In Figures 8 and 9, the diaphragm, or pressure sensitive means, is designated at 38' and the actuating means for the valve members (not shown) includes the bell crank 54'. The diaphragm 38' carries centrally thereon for movement therewith a member 66, the lower portion of which is tubular, as shown, and the upper portion of which carries the reset rod, or stem, 47'. The diaphragm 38' also carries on its upper side a dished member 68 which cooperates to engage and maintain the spring 50' centered. The member 66 is appropriately secured to diaphragm 38' by means of annular flange 70 on member 66 and nut 72 threaded to member 66, said nut 72 and flange 70 cooperating to clamp diaphragm 38', plate 45', and dished member 68 therebetween.

The tubular portion of member 66 has mounted therein a tubular insert 74, a portion of which is spaced from the inner wall of member 66 to define an annular recess 76 therebetween. Resilient biasing means are carried within said tubular portion of member 66 and includes a compressed coil spring 78 positioned in recess 76. The lower end of spring 78 engages an annular washer 80 to bias said washer 80 downwardly. Washer 80 carries an annular flange 81 for cooperation with spring 78 and also has a conical annular surface 82 for cooperation with a plurality of balls 84 positioned thereagainst. The lower end of member 66 has an annular nut 86 threaded thereinto, which nut provides a conical annular surface 88 for cooperation with said plurality of balls 84 positioned thereagainst.

An elongated rod 90 is positioned to extend through annular nut 88 and through washer 80 and coaxially within tube 74. Said rod 90 has a tapered-wall groove 92 formed therein adapted to receive therein the walls 84 under the bias of the above described resilient biasing means, as shown in Figure 8, where the pressure sensitive means 38' is operatively connected to said bell crank 54'. The spring 78 acting through washer 80 operates to cause said balls 84 to be moved axially inwardly, while the balls 84 are also able to be forced radially outwardly along the inclined conical surfaces 82 and 86 against the bias of spring 78. The member 66 is detachably joined to said rod 90 in such a manner as to resist, to a limited extent, a force which tends to detach said member 66 and said rod 90. However, upon sufficient separating forces being applied to member 66 and rod 90, the balls 84 are caused to move radially outwardly sufficiently to permit separation of said members and movement of said members to a position shown in Figure 9.

Thereafter, the valve controller may be reset by depressing the reset rod 47' until the balls 84 are again seated in groove 92, whereupon the rod 90 and member 66 are again operatively connected to each other. The rod 90 is provided with a conical surface 94 over which the balls 84 are adapted to pass, which provides for ease in resetting of the valve controller. The rod 90 and tube 74 cooperate to maintain alignment of the parts and to serve as a guide during the resetting operation.

The lower portion of rod 90 carries a bifurcated portion 96 with a pin 98 extending between the sections of the bifurcated portion. The bell crank 54' has an arm 100 which extends through said bifurcated portion 96 and engages pin 98, as shown in Figures 8 and 9, to form an operative connection between rod 90 and bell crank 54'.

Thus it can be seen that this invention provides a pressure regulator that will shut-off the flow of fluid when the line pressure becomes too low or too high and which provides that the regulator will operate to shut safely, or "fail safe," if and when the first shut-off fails to operate during the high pressure condition. Furthermore, a simple means is provided for resetting the regulator after it has "failed safe".

While there has been shown and described a particular embodiment of this invention, it will be obvious to those skilled in the art that various changes and modifications may be made therein without departing from the invention and, therefore, it is intended in the appended claims to cover all such changes and modifications as fall within the true spirit and scope of the invention.

What we claim as new, and desire to secure by Letters Patent of the United States, is:

1. A valve for use in fluid flow systems comprising a valve body having an inlet and an outlet, said valve body having a fluid flow passageway therethrough, a pair of valve members mounted within said valve body and adapted to block the fluid flow passageway therethrough when actuated, a pressure sensitive means movably responsive to the pressure of the fluid in the fluid flow passageway, actuating means operatively connecting the pressure sensitive means and the valve members, means detachably joining the actuating means to the pressure sensitive means, means limiting the motion of the actuating means in one direction, means affording additional motion of the pressure sensitive means after the motion of the actuating means has been stopped, whereby said actuating means are operatively disconnected from the pressure sensitive means, and a spring biasing one of the valve members in the direction opposite to said one direction to a closed position after the detachable means are operatively disconnected.

2. A valve for use in fluid flow systems comprising a valve body having an inlet and an outlet, said valve body having a fluid flow passageway therethrough, an orifice member in said valve body, said orifice member having an inlet side and an outlet side, a valve seat on each side of the orifice member, a valve member for each valve seat, means passing through the orifice and connecting the two valve members so that they move simultaneously, a pressure operated diaphragm, a diaphragm chamber having one side thereof closed by said diaphragm, actuating means in said diaphragm chamber connecting the diaphragm to the valve members, means detachably joining the actuating means to the diaphragm, means limiting the motion of the actuating means when the fluid pressure exceeds an upper limit, means affording additional movement of the pressure sensitive means after the motion of the actuating means has been stopped, whereby said actuating means is detached from the diaphragm, guide means aligning the disconnected actuating means and the diaphragm providing for easy reconnecting, means for seating one valve member when the pressure exceeds an upper limit, means for seating the second valve member when the fluid pressure falls below a lower limit, and spring means for seating the second valve member when the fluid pressure exceeds the upper pressure limit and the first valve member fails to seat properly.

3. A valve for use in fluid flow systems comprising a valve body having an inlet and an outlet, said valve body having a fluid flow passageway therethrough, a pair of valve members mounted within said valve body and adapted to block the fluid flow passageway therethrough when actuated, a pressure sensitive means responsive to the pressure of the fluid in the fluid flow passageway, actuating means operatively connecting the pressure sensitive means and the valve members, a pair of members detachably joined together, one of said pair of members being connected to said pressure sensitive means and the other member being connected to said actuating means, one of said members including resilient spring elements frictionally clasping the other member, means limiting the motion of the actuating means, said pressure sensitive means being movable beyond the point where said actuating means are stopped to operatively disconnect said detachable members, whereby said actuating means are operatively disconnected from said pressure sensitive means, and means operating one of the valve members to a closed position after the detachable members are operatively disconnected.

4. A valve for use in fluid flow systems comprising a valve body having an inlet and an outlet, said valve body having a fluid flow passageway therethrough, a pair of valve members mounted within said valve body and adapted to block the fluid flow passageway therethrough when actuated, a pressure sensitive means responsive to the pressure of the fluid in the fluid flow passageway, actuating means operatively connecting the pressure sensitive means and the valve members, a pair of members detachably joined together, one of said pair of members being connected to said pressure sensitive means and the other member being connected to said actuating means, said pair of members being magnetically attracted to each other and cooperating each with the other to resist, to a limited extent, a force which tends to detach said members, means limiting the motion of the actuating means, said pressure sensitive means being movable beyond the point where said actuating means are stopped to operatively disconnect said detachable members, whereby said actuating means are operatively disconnected from said pressure sensitive means, and means moving one of the valve members to a closed position after the detachable members are operatively disconnected.

5. A valve for use in fluid flow systems comprising a valve body having an inlet and an outlet, said valve body having a fluid flow passageway therethrough, a pair of valve members mounted within said valve body and adapted to block the fluid flow passageway therethrough when actuated, a pressure sensitive means movably responsive to the pressure of the fluid in the fluid flow passageway, actuating means operatively connecting the pressure sensitive means and the valve members, a pair of members detachably joined together, one of said pair of members being connected to said pressure sensitive means and the other member being connected to said actuating means, means limiting the motion of said actuating means, said pressure sensitive means being movable beyond the point where said actuating means are stopped to operatively disconnect said detachable members, whereby said actuating means are operatively disconnected from said pressure sensitive means, guide means aligning the disconnected actuating means and the pressure sensitive means and providing for easy reconnecting of the disconnected means, and means operating one of the valve members to a closed position after the detachable members are operatively disconnected.

6. A valve for use in fluid flow systems comprising a valve body having an inlet and an outlet, said valve body having a fluid flow passageway therethrough, a valve member mounted within said valve body and adapted to block the fluid flow passageway therethrough when actuated, a pressure sensitive means movably responsive to the pressure of the fluid in the fluid flow passageway, actuating means operatively connecting the pressure sensitive means to the valve member, a pair of members detachably joined together, one of said pair of members being secured to said pressure sensitive means and the other member secured to said actuating means, said pair of members cooperating each with the other to resist, to a limited extent, a force which tends to detach said members, means limiting the motion of said actuating means, said pressure sensitive means being movable beyond the point where said actuating means are stopped to operatively disconnect said detachable members, whereby said actuating means are operatively disconnected from said pressure sensitive means, and means operating the valve member to block the fluid flow passageway after the detachable members are operatively disconnected.

7. A valve for use in fluid flow systems comprising a valve body having an inlet and an outlet, said valve body having a fluid flow passageway therethrough, a valve member mounted within said valve body and adapted to block the fluid flow passageway therethrough when actuated, a pressure sensitive means movably responsive to the pressure of the fluid in the fluid flow passageway, actuating means operatively connecting the pressure sensitive means to the valve member, a pair of members detachably joined together, one of said pair of members being connected to said pressure sensitive means and the other member being connected to said actuating means, said pair of members being magnetically attracted to each other and cooperating each with the other to resist, to a limited extent, a force which tends to detach said members, means limiting the motion of the actuating means, said pressure sensitive means being movable beyond the point where said actuating means are stopped to operatively disconnect said detachable members, whereby said actuating means are operatively disconnected from said pressure sensitive means, and means operating the valve member to block the fluid flow passageway after the detachable magnetic members are operatively disconnected.

8. A valve for use in fluid flow systems comprising a valve body having an inlet and an outlet, said valve body having a fluid flow passageway therethrough, a valve member mounted within said valve body and adapted to block the fluid flow passageway therethrough when actuated, a pressure sensitive means movably responsive to the pressure of the fluid in the fluid flow passageway, actuating means operatively connecting the pressure sensitive means to the valve member, a pair of members detachably joined together, one of said pair of members being connected to said pressure sensitive means and the other being connected to said actuating means, one of said members including resilient spring elements frictionally clasping the other member, means limiting the motion of the actuating means, said pressure sensitive means being movable beyond the point where said actuating means are stopped to operatively disconnect said detachable members, whereby said actuating means are operatively disconnected from said pressure sensitive means, and means operating the valve member to block the fluid flow passageway after the detachable spring clasp members are operatively disconnected.

9. A valve for use in fluid flow systems comprising a valve body having an inlet and an outlet, said valve body having a fluid flow passageway therethrough, a valve member mounted within said valve body and adapted to block the fluid flow passageway therethrough when actuated, a pressure sensitive means movably responsive to the pressure of the fluid in the fluid flow passageway, actuating means operatively connecting the pressure sensitive means to the valve member, a pair of members detachably joined together, one of said pair of members being connected to said pressure sensitive means and the other member being connected to said actuating means, means limiting the motion of said actuating means, said pressure sensitive means being movable beyond the point where said actuating means are stopped to operatively disconnect said detachable members, whereby said actuating means are operatively disconnected from said pressure sensitive means, guide means aligning the operatively disconnected actuating means and the pressure sensitive means and providing for easy reconnecting of the disconnected means, and means operating the valve member to block the fluid flow passageway after the detachable means are operatively disconnected.

10. A valve for use in fluid flow systems comprising a valve body having an inlet and an outlet, said valve body having a fluid flow passageway therethrough, a pair of valve members mounted within said valve body and adapted to block the fluid flow passageway therethrough when actuated, a pressure sensitive means movably responsive to the pressure of the fluid in the fluid flow passageway, actuating means operatively connecting the pressure sensitive means and the valve members, a pair of members detachably joined together, one of said pair of members being connected to said pressure sensitive means and the other member being connected to said actuating means, said pair of members cooperating each with the other to resist, to a limited extent, a force which tends to detach said members, means limiting the motion of said actuating means, said pressure sensitive means being movable beyond the point where said actuating means are stopped to operatively disconnect said detachable members, whereby said actuating means are operatively disconnected from said pressure sensitive means, and means moving one of the valve members to a closed position after the detachable members are operatively disconnected.

11. A valve for use in fluid flow systems comprising a valve body having an inlet and an outlet, said valve body having a fluid flow passageway therethrough, a valve member mounted within said valve body and adapted to block the fluid flow passageway therethrough when actuated, a pressure sensitive means movably responsive to the pressure of the fluid in the fluid flow passageway, actuating means operatively connecting the pressure sensitive means to the valve member, a pair of members one of which is connected to said pressure sensitive means and the other being connected to said actuating means, resiliently biased means carried by one of said pair of members and detachably engaging the other member to form a rupturable connection between said members, which rupturable connection resists, to a limited extent, a force which tends to rupture said connection, means limiting the range of movement of said actuating means, said pressure sensitive means being movable beyond the point where said actuating means are stopped to rupture said rupturable connection, whereby said actuating means are operatively disconnected from said pressure sensitive means, and means operating the valve member to block the fluid flow passageway after said rupturable connection has been ruptured.

12. A valve for use in fluid flow systems comprising a valve body having an inlet and an outlet, said valve body having a fluid flow passageway therethrough, a valve member mounted within said valve body and adapted to block the fluid flow passageway therethrough when actuated, a pressure sensitive means movably responsive to the pressure of the fluid in the fluid flow passageway, actuating means operatively connecting the pressure sensitive means to the valve member, a pair of members one of which is connected to said pressure sensitive means and the other being connected to said actuating means, a first member of said pair of members carrying at least one clasping element, the second of said pair of members having a recess formed therein, resilient means operatively associated with said clasping element for biasing said clasping element in a direction for entering said recess when the recess and clasping element are in register to thereby form a rupturable connection between said members, which rupturable connection resists, to a limited extent, a force which tends to rupture said connection, means limiting the range of movement of said actuating means, said pressure sensitive means being movable beyond the point where said actuating means are stopped to rupture said rupturable connection, whereby said actuating means are operatively disconnected from said pressure sensitive means, and means operating the valve member to block the fluid flow passageway after said rupturable connection has been ruptured.

13. A valve for use in fluid flow systems comprising a valve body having an inlet and an outlet, said valve body having a fluid flow passageway therethrough, a valve member mounted within said valve body and adapted to block the fluid flow passageway therethrough when actuated, a pressure sensitive means movably responsive to the pressure of the fluid in the fluid flow passageway, actuating means operatively connecting the pressure sensitive means to the valve member, a pair of members one of which is connected to said pressure sensitive means and the other being connected to said actuating means, a first member of said pair of members carrying at least one ball element, the second of said pair of members having a recess formed therein, a spring operatively associated with said ball element for biasing said ball element in a direction for entering said recess when the recess and ball element are in register to thereby form a rupturable connection between said members, which rupturable connection resists, to a limited extent, a force which tends to rupture said connection, means limiting the range of movement of the actuating means, said pressure sensitive means being movable beyond the point where said actuating means are stopped to rupture said rupturable connection, whereby said actuating means are operatively disconnected from said pressure sensitive means, and means operating the valve member to block the fluid flow passageway after said rupturable connection has been ruptured.

14. A valve for use in fluid flow systems comprising a valve body having an inlet and outlet, said valve body having a fluid flow passageway therethrough, a valve member mounted within said valve body and adapted to block the fluid flow passageway therethrough when actuated, a pressure sensitive means movably responsive to the pressure of the fluid in the fluid flow passageway, actuating means operatively connecting the pressure sensitive means to the valve member, a pair of members detachably joined together, one of said pair of members being connected to said pressure sensitive means and the other member being connected to said actuating means, said pair of members cooperating each with the other to resist, to a limited extent, a force which tends to detach said members, means limiting the range of movement of said actuating means, said pressure sensitive means being movable beyond the point where said actuating means are stopped to operatively disconnect said detachable members, whereby said actuating means are operatively disconnected from said pressure sensitive means, means operating the valve member to block the fluid flow passageway after the detachable members are operatively disconnected, and a manually engageable stem operatively associated with one of said pair of detachable members affording means for reconnecting the detachable members after they have been detached.

15. A valve for use in fluid flow systems comprising a valve body having an inlet and an outlet, said valve body having a fluid flow passageway therethrough, a valve member mounted within said valve body and adapted to block the fluid flow passageway therethrough when actuated, a pressure sensitive means movably responsive to the pressure of the fluid in the fluid flow passageway, actuating means operatively connecting the pressure sensitive means to the valve member, a pair of members detachably joined together, one of said pair of members being connected to said pressure sensitive means and the other member being connected to said actuating means, said pair of members cooperating each with the other to resist, to a limited extent, a force which tends to detach said members, means limiting the range of movement of said actuating means, said pressure sensitive means being movable beyond the point where said actuating means are stopped to operatively disconnect said detachable members, whereby said actuating means are operatively disconnected from said pressure sensitive means, means operating the valve member to block the fluid flow passageway after the detachable members are operatively disconnected, and a manually engageable stem connected to the detachable member which is connected to said pressure sensitive means affording means for operatively reconnecting the detachable members.

16. A valve for use in fluid flow systems comprising a valve body having an inlet and an outlet, said valve body having a fluid flow passageway therethrough, a valve member mounted within said valve body and adapted to block the fluid flow passageway therethrough when actuated, a pressure sensitive means movably responsive to the pressure of the fluid in the fluid flow passageway, actuating means operatively connecting the pressure sensitive means to the valve member, a pair of members detachably joined together, one of said pair of members being connected to said pressure sensitive means and the other member being connected to said actuating means, said pair of members cooperating each with the other to resist, to a limited extent, a force which tends to detach said members, means limiting the range of movement of the actuating means, said pressure sensitive means being movable beyond the point where said actuating means are stopped to operatively disconnect said detachable members, whereby said actuating means are operatively disconnected from said pressure sensitive means, means operating the valve member to block the fluid flow passageway after the detachable members are operatively disconnected, and a manually engageable stem carried by said pressure sensitive means and being connected thereby to one of said detachable members, said stem affording means for operatively reconnecting the detachable members.

17. A valve for use in fluid flow systems comprising a valve body having an inlet and an outlet, said valve body having a fluid flow passageway therethrough, a valve member mounted within said valve body and adapted to block the fluid flow passageway therethrough when actuated, a pressure sensitive means movably responsive to the pressure of the fluid in the fluid flow passageway, actuating means operatively connecting the pressure sensitive means to the valve member, a pair of members detachably joined together, one of said pair of members being connected to said pressure sensitive means and the other member being connected to said actuating means, means limiting the range of movement of said actuating means, said pressure sensitive means being movable beyond the point where said actuating means are stopped to operatively disconnect said detachable members, whereby said actuating means are operatively disconnected from said pressure sensitive means, means operating the valve member to block the fluid flow passageway after the detachable means are operatively disconnected, a manually engageable stem operatively associated with one of said pair of detachable members affording means for reconnecting the detachable members after they have been detached, and guide means aligning said detachable members when in detached condition to provide for easy reconnecting of said detachable members.

No references cited.